United States Patent
Oestreich

(10) Patent No.: US 6,445,910 B1
(45) Date of Patent: Sep. 3, 2002

(54) RECEPTION DIVERSITY METHOD, AND A RADIO COMMUNICATION SYSTEM USING DIVERSITY RECEPTION

(75) Inventor: Stefan Oestreich, Holzkirchen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/363,276

(22) Filed: Jul. 28, 1999

(30) Foreign Application Priority Data

Jul. 28, 1998 (DE) .......................................... 198 33 967

(51) Int. Cl.$^7$ .............................. H04B 1/06; H04B 7/00
(52) U.S. Cl. ................ 455/277.1; 455/277.2; 375/347; 375/267
(58) Field of Search .............................. 455/500, 67.1, 455/132, 226.1, 226.2, 277.1, 277.2, 133, 137, 134, 135, 278.1; 375/225, 224, 227, 376, 347, 267; 342/367; 370/335, 342; 714/704; 395/853, 854

(56) References Cited

U.S. PATENT DOCUMENTS

| | | | | | |
|---|---|---|---|---|---|
| 5,280,637 A | * | 1/1994 | Larosa et al. | ................ | 455/134 |
| 5,465,271 A | * | 11/1995 | Hladik et al. | ................ | 375/267 |
| 5,621,770 A | * | 4/1997 | Zastera | ........................ | 375/347 |
| 5,684,793 A | * | 11/1997 | Kiema et al. | ................ | 370/335 |
| 5,796,777 A | * | 8/1998 | Terlep et al. | ................ | 375/227 |
| 5,832,300 A | * | 11/1998 | Lowthert | ..................... | 395/853 |
| 5,898,741 A | * | 4/1999 | Nagashima | ................. | 375/347 |
| 6,085,076 A | * | 7/2000 | Lindsay et al. | .......... | 455/277.1 |
| 6,128,355 A | * | 10/2000 | Backman et al. | ............ | 375/347 |
| 6,189,123 B1 | * | 2/2001 | Nystrom et al. | ............. | 714/751 |

* cited by examiner

*Primary Examiner*—Nay Maung
*Assistant Examiner*—Joy K. Contee
(74) *Attorney, Agent, or Firm*—Laurence A. Greenberg; Werner H. Stemer; Ralph E. Locher

(57) ABSTRACT

A radio diversity method in which a first received signal is received by a first antenna and a second received signal is received by a second antenna. The first received signal and the second received signal are converted from an analog format to a digital format. Digital signal values are in each case detected, with quality levels being defined in each case for the digital signal values. An evaluation device evaluates the quality levels and, depending on the evaluation result, passes on only portions of the digital signal values for subsequent combination. This reduces the data rate that needs to be transmitted, for example, during a soft hand over.

12 Claims, 3 Drawing Sheets

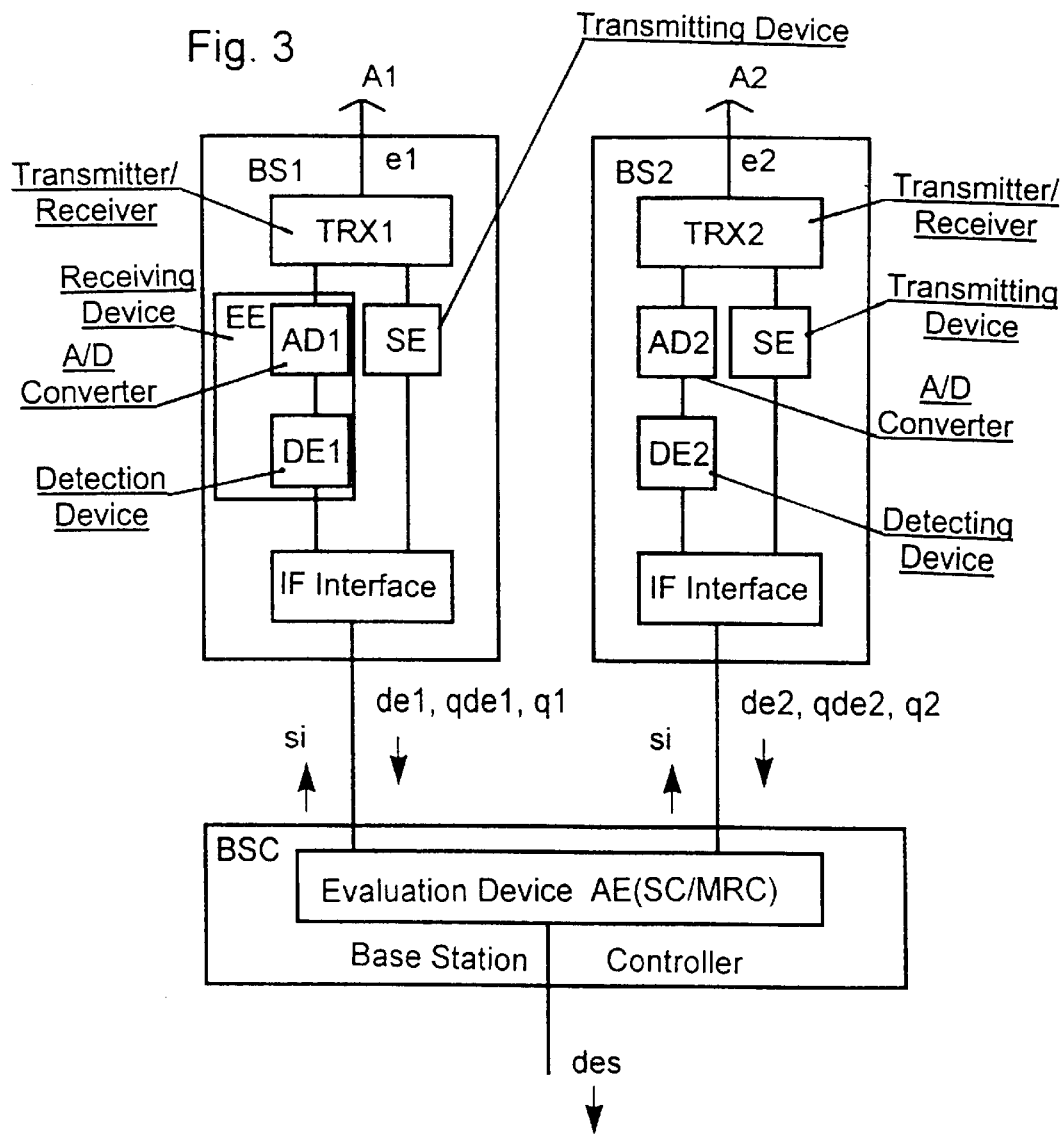

RECEPTION DIVERSITY METHOD, AND A RADIO COMMUNICATION SYSTEM USING DIVERSITY RECEPTION

BACKGROUND OF THE INVENTION

Field of the Invention

The invention relates to a reception diversity method and to a radio communications system using diversity reception. In a reception diversity method a first antenna receives a first signal and a second antenna receives a second signal. The first and second signals are then converted from an analog format to a digital format and the resulting digital signal values are detected and quality levels are in each case defined for the digital signal values. Such a radio communications system is formed of at least two base stations each having an antenna for receiving the first and second signals. In addition, analog-to-digital converters are provided for converting the analog signals along with a device for detecting the resultant digital signal.

In radio communications systems, information (for example voice, video information, internet messages or other data) are transmitted using electromagnetic waves via a radio interface between a transmitting and a receiving radio station (base station and mobile station, respectively). The electromagnetic waves are in this case transmitted using carrier frequencies that are in a frequency band intended for the respective system.

Known second-generation digital mobile radio systems are the global system for mobile communications (GMS) mobile radio system and the IS-95 mobile radio system, which use carrier frequencies of 900, 1800 and 1900 MHz. Frequencies in the frequency band around 2000 MHz are envisaged for future mobile radio systems using CDMA or TDMA/CDMA transmission methods via the radio interface, for example universal mobile telecommunication system (UMTS) or other 3rd-generation systems.

Reception diversity methods are known from digital radio communications systems, for example Published, European Patent Application EP 96 114 902 A in this context, discloses received signals which have been received at different points and are combined after being converted from analog to digital form and after detection in order to improve the reception quality. Two methods are known for combination, they are selective combination and maximum ratio combining (MRC) combination. In the former case, the signal whose quality is better is selected. The quality of signals is normally assessed by using quality levels related to a frame and obtained in the receiver.

In the other case, the signals are linked on the basis of individual symbols and their quality levels, and a sum signal is formed. The data rates that need to be transmitted for MRC combination of the received signals and quality levels are, however, considerable, so that greatly derated transmission capacities need to be reserved on the network side.

SUMMARY OF THE INVENTION

It is accordingly an object of the invention to provide a reception diversity method, and a radio communication system using diversity reception which overcome the above-mentioned disadvantages of the prior art methods and devices of this general type, which reduces the data rates that needs to be transmitted with high reception quality.

With the foregoing and other objects in view there is provided, in accordance with the invention, a method for reception diversity, which includes:

receiving a first received signal via a first antenna;

receiving a second received signal via a second antenna;

converting the first received signal and the second received signal from an analog format to a digital format resulting in digital signal values;

detecting the digital signal values;

defining quality levels for the digital signal values; and evaluating in an evaluator the quality levels, and requesting only portions of the digital signal values in dependence on results of an evaluation.

In the radio diversity method according to the invention, the first received signal is received by the first antenna, and the second received signal is received by the second antenna. The first received signal and the second received signal are converted from an analog format to a digital format, and digital signal values as well as quality levels related to them are defined in a digital receiver. Quality levels are advantageously defined not only for each of the digital signal values, but also for each frame. At least a portion of the quality levels is evaluated by an evaluation device and, depending on the evaluation result, only portions of the digital signal values are requested for subsequent combination.

In consequence, only those signal values and quality levels that are actually required for diversity combination need be transmitted. If selective combination can be used relatively frequently, then the data rate that needs to be transmitted is considerably reduced. If the line capacity between the evaluation device and the antenna and/or receiver is severely limited, at least partial MRC combination is thus feasible for the first time, since the multiple data rate need not be reserved for all connections.

The process of passing on the digital signal values is requested adaptively by an evaluation device. The method results in advantages particularly if the antennas are widely separated from the device carrying out the combination, for example in the case of macro-diversity reception. The data rate can be matched precisely to the transmission capacity of the lines, which are often only rented.

According to one advantageous development of the invention, only the first digital signal values are requested for passing on if the quality level for the first digital signal values is considerably better than the quality level for the second digital signal values. In this case, the results of selective combination are better, that is to say the selection of the first digital signal values and the transmission of the second digital signal values in the network can be stopped at an early stage.

If the quality levels for the first digital signal values are only slightly better than the quality levels for the second digital signal values, at least portions of both digital signal values are passed on with the associated quality levels, for example on a symbol basis. MRC combination can thus be used which, in this case, provides values whose quality is better.

In order to reduce the data rate further, only particularly important symbols are passed on for MRC combination. The gain from MRC combination is at its greatest for transmission quality in the case of these particularly important symbols.

Furthermore, it is advantageous to monitor the change in the quality levels over a time period that can be predetermined and, in the event of rapid changes, to prefer that at least portions of both digital signal values be passed on. This reduces the signaling complexity and the delay time, since there is no need to wait for data that can be requested from time to time.

The reduction in the data rate that needs to be transmitted is particularly important if the two antennas are disposed in different base stations in a radio communications system, and the evaluation device is disposed in a base station controller which forms digital signal values that result from the two digital signal values. The base station and the base station controller are two components in the radio communications system, which communicate with one another for data transmission. The data rate of this connection is reduced by the invention. With regard to hand over procedures for a connection between two base stations, the so-called "soft hand over" with two reception paths at times, the adaptive control process according to the invention for signal transmission matched to the requirement results in considerable advantages.

Other features which are considered as characteristic for the invention are set forth in the appended claims.

Although the invention is illustrated and described herein as embodied in a reception diversity method, and a radio communication system using diversity reception, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a simplified block diagram of base stations and of a base station controller.

DESCRIPTION OF THE PREFERRED EMBODIMENT

Figure 1:
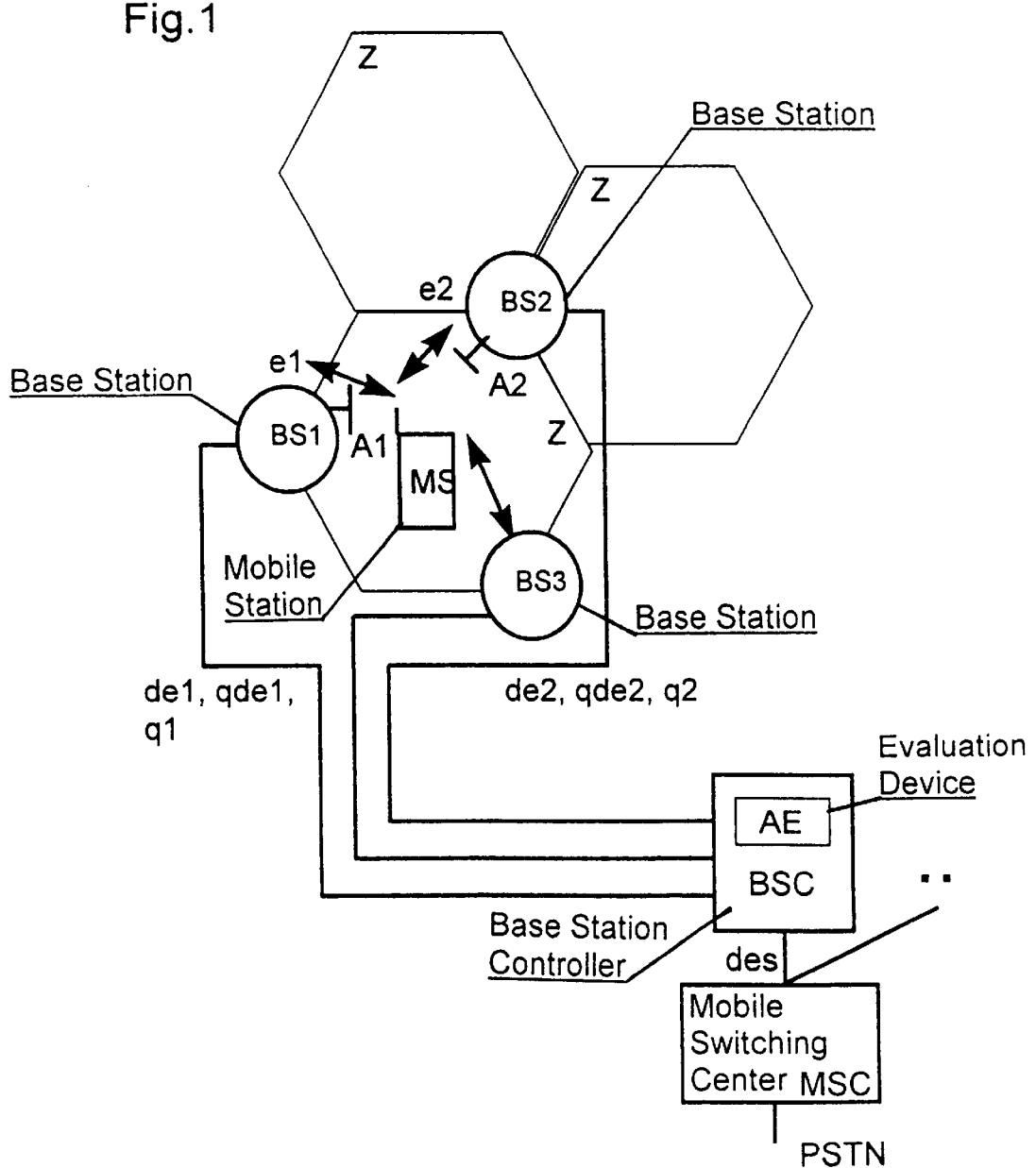
FIG. 1 is a diagrammatic, block diagram of a cellular radio communications system according to the invention.

In all the figures of the drawing, sub-features and integral parts that correspond to one another bear the same reference symbol in each case. Referring now to the figures of the drawing in detail and first, particularly, to FIG. 1 thereof, there is shown a radio communications system that has at least one mobile switching center MSC, which is networked with other mobile switching centers and provides access to a fixed network PSTN. Furthermore, the mobile switching center MSC is connected to at least one base station controller BSC. Each base station controller BSC in turn allows a connection to base stations BS1, BS2, BS3. The base stations BS1, BS2, BS3 supply radio cells Z having radio resources. The mobile switching center MSC, the base station controller BSC and the base stations BS1, BS2, BS3 are configured in a way that is known from the GSM mobile radio system.

In the case of third-generation systems (UMTS), the base station controller BSC corresponds to a radio network controller (RNC). There, a plurality of base stations BTS are also combined in a node, node B, which in turn has a connection to the RNC. In this case, the invention relates both to the BTS—node B connection and to the node B—RNC connection.

The three base stations BS1, BS2, BS3 can set up a communication link to mobile stations MS via a radio interface. By way of example, FIG. 1 shows such a radio link to a mobile station MS.

The radio interface between the base stations BS1, BS2, BS3 and the mobile station MS is organized using a time-division multiplex method. For example, eight timeslots are thus provided on one carrier frequency, and can be used for different communication links and for organization of the radio interface. Details relating to the organization of the radio interface can be found, for example, in M. Mouly, M. B. Pautet, "The GSM System for Mobile Communications", 1992. The radio interface is furthermore, optionally, organized in accordance with the frequency-division multiplex method, so that communication links to the mobile stations MS can be set up from a radio station on a plurality of carrier frequencies. Accordingly, a radio channel is characterized by its carrier frequency and by the time-slot. In third-generation systems, the radio interface is organized in accordance with a code-division multiplex method. A radio channel is defined by its carrier frequency and by one or more codes.

FIG. 1 will be used to show how two of the three base stations BS1, BS2 both maintain a link to the mobile station MS, for example during a hand over procedure. The two base stations BS1, BS2 each have an antenna A1, A2 for receiving signals e1, e2 and process the signals to form digital signal values de1, de2, in which case quality levels qde1, qde2 are in each case obtained per signal value, and quality levels q1, q2 per frame. A frame contains, for example, 100 to 500 signal values.

The signal values de1, de2 and the quality levels qde1, qde2, q1, q2 are supplied to an evaluation device AE, where they are combined to form a sum signal whose quality is higher. The evaluation device AE may be contained in the base station controller BSC in the GSM system, or in the node B or RNC, or in both, in the case of UMTS. The evaluation device AE in the node B can combine the signals from the base stations covered there, and the RNC can combine the signals from a plurality of nodes B, in a number of stages. The base stations BS1, BS2 can thus jointly ensure a high-quality communication link to a mobile station MS.

Figure 2:
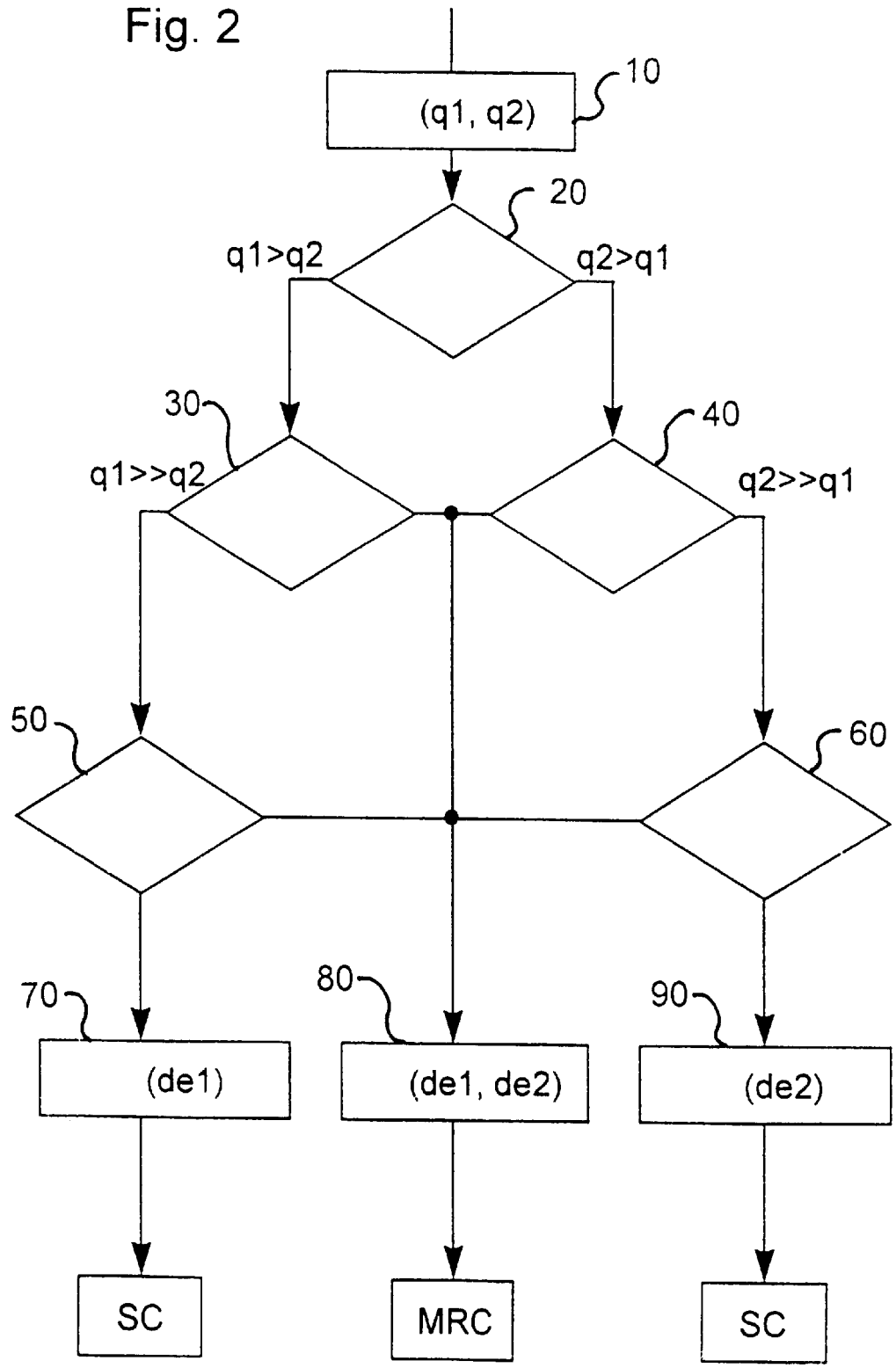
FIG. 2 is a flow chart of a diversity reception method.

According to FIG. 2, the reception diversity method includes the below listed method steps.

In a first step 10, the quality levels q1 and q2 are received and evaluated by the evaluation device AE. In a second step 20, confirmation is obtained as to whether the first quality level q1 is higher than the second quality level q2, or vice versa. Depending on the comparison result, a third or fourth step 30, 40 is used to confirm whether the first or second quality level q1, q2 is significantly higher than the respective other quality level q2, q1. There must therefore be a certain difference value which can be set between the quality levels q1, q2. The smaller the difference value, the more frequently—as will be shown later—will selective combination be chosen, and the data rate thus greatly reduced.

During detection, specific values are used as quality levels, such as a bit error rate, so-called "soft decision values" or the parameters RXLEV and RXQUAL that are known from the GSM mobile radio system. According to the invention, the term quality level also represents a combination of a plurality of primary variables that describe the quality of the digital signal values de1, de2, both for each signal value and with respect to the frame. It is also within the context of the invention for not just two received signals e1, e2 to be included in the diversity reception method, but also for it to be possible to combine three or more signals.

In a fifth or sixth step 50, 60, the current comparison result is related to one or more previous comparison results. The By change in the quality levels q1, q2 is thus monitored over a time period which can be predetermined. If the changes are rapid, then it is preferred to pass on at least portions of both digital signal values de1, de2 with the associated, symbol-related quality levels qde1, qde2—see step 80.

If one of the quality levels q1 or q2 is considerably greater than the other—see steps 30 and 50 or 40 and 60, then, in a seventh or ninth step 70, 90, respectively, only the digital signal values de1, de2, respectively, of the reception path associated with the better quality level q1 or q2, respectively, are requested. N selective combinations SC is thus carried out. The digital signal values de1 or de2 that are passed on thus correspond to the sum signal des.

If the difference between the quality levels q1, q2 is only slight, then, in step 80, both digital signal values de1 and de2 are requested, and are passed on with the associated symbol-related quality levels qde1, qde2, so that MRC combination is carried out in the evaluation device.

The digital signal values de1, de2 are transmitted frame-by-frame, in the sense of a time-division multiplex method, between the components BS1, BS2, BSC of the radio communications system. The changeover between passing on the digital signal values de1, de2 and symbol-related quality levels qde1, qde2 for a connection thus takes place, for example, from frame to frame. In order to refine the method further, the changeover may also be possible more frequently, so that the number of digital signal values de1, de2 and symbol-related quality levels qde1, qde2 passed on from a base station BS1, BS2 is also less than one frame.

Furthermore, instead of or in addition to the frame-related quality levels q1, q2, the evaluation device AE may evaluate the symbol-related quality levels qde1, qde2, in particular for the important bits.

If the information to be transmitted is voice data, then a distinction is drawn between bits of different importance during the coding of the data. In this case, the particularly important symbols are additionally protected by better error-protection coding. In the sense of the invention, these particularly important symbols are actually passed on when MRC combination is intended to be carried out. It is thus unnecessary for the eighth step 80 for both digital signal values de1, de2 and the associated symbol-related quality levels qde1, qde2 to be passed on completely. It is sufficient to pass on, for example, the first digital signal values de1 completely and the particularly important symbols from the second digital signal values de2. The associated symbol-related quality levels qde1, qde2 must also be transmitted for these signal values. Thus, selective combination SC is carried out for some symbols, and MRC combination for other symbols.

FIG. 3 shows, schematically, the layout of the base stations BS1 and BS2. The base stations BS1, BS2 each contain a transmitting/receiving section TX/RX for radio-frequency processing of transmitted and received signals e1, e2 which are received or are to be transmitted via an antenna A1, A2.

Furthermore, a transmitting device SE and a receiving device EE are connected to the transmitting/receiving section TX/RX. The transmitting device SE will not be explained any further. The receiving device EE contains an analog/digital converter AD1, AD2 and a detection device DE1, DE2. The received signals e1, e2 are converted to base band, and are converted to digital received signals. The detection device DE1, DE2 reconstructs the transmitted digital signals, for example by Viterbi detection or a RAKE receiver, in which case quality levels qde1, qde2, q1, q2 relating to the quality of the detection are produced in addition to the digital signal values de1, de2.

The digital signal values de1, de2 and the quality levels qde1, qde2, q1, q2 are passed on via an interface device IF to the base station controller BSC which, for its part, transmits signaling information si for passing on the digital signal values and quality levels de1, de2, qde1, qde2, q1, q2 to the base stations BS1, BS2. In the base station controller BSC or in a node B or RNC, the evaluation device AE carries out the selective combination or MRC combination, so that a high-quality sum signal des which is matched to the transmission conditions is produced, and the data rate between the base stations BS1, BS2 and the base station controller BSC is nevertheless kept low.

I claim:

1. A method for reception diversity, which comprises:
   receiving a first received signal via a first antenna;
   receiving a second received signal via a second antenna;
   converting the first received signal and the second received signal from an analog format to a digital format resulting in digital signal values;
   detecting the digital signal values;
   defining quality levels for the digital signal values;
   evaluating in an evaluator the quality levels; and
   choosing a method to be used for a diversity combination by the evaluator, and requesting only portions of the digital signal values required for the diversity combination, in dependence on results of an evaluation.

2. The method according to claim 1, which comprises defining the quality levels for each signal value and for each frame.

3. The method according to claim 2, which comprises evaluating continuously the quality levels of the frame, and the quality levels are requested for the signal value depending on a result of the evaluation.

4. The method according to claim 3, which comprises including some of the quality levels of most important signal values in the evaluation.

5. The method according to claim 4, which comprises providing the evaluator with symbol-related quality levels of most important symbols in the evaluation.

6. The method according to claim 1, which comprises forwarding on only the first digital signal value if the quality levels for the first digital signal value are considerably better than the quality levels for the second digital signal value.

7. The method according to claim 5, which comprises requesting that at least portions of the digital signal values of both the first received signals and the second received signal and, associated symbol-related quality levels, be forwarded on if the quality levels for the first digital signal value are only slightly better than the quality levels for the second digital signal value.

8. The method according to claim 7, which comprises forwarding on the portions of the digital signal values that are particularly important symbols.

9. The method according to claim 7, which comprises carrying out a maximum ration combining (MRC) combination with the aid of the symbol-related quality levels of the portions of the digital signal values forwarded on.

10. The method according to claim 1, which comprises monitoring a change in the quality levels over a predetermined time period and, in the event of rapid changes, forwarding on at least portions of the digital signal values of the first received signal and the second received signal.

11. The method according to claim 1, which comprises:
    disposing the first antenna and the second antenna in different base stations of a radio communications systems; and disposing the evaluator in a base station controller and the evaluator forming final digital signal values from the digital signal values of the first received signal and the second received signal.

12. A radio communication system using diversity reception, comprising:

at least two base stations including a first base station having an antenna receiving a first received signal and a second base station having an antenna receiving a second received signal;

analog/digital converters disposed in said at least two base stations for converting the first received signal and the second received signal from an analog format to a digital format resulting in digitally received signals;

detectors for detecting the digitally received signals and for producing digital signal values, said detectors defining quality levels for the digital signal values of the first received signal and the second received signal;

a base station controller for connecting said at least two base stations to components on a network side; and an evaluator disposed in said base station controller, said evaluator evaluating at least a portion of the quality levels and, in dependence on results of an evaluation, said evaluator requesting only portions of the digital signal values for forwarding on from said at least two base stations.

* * * * *